(12) United States Patent
Usami et al.

(10) Patent No.: US 10,162,989 B2
(45) Date of Patent: Dec. 25, 2018

(54) SENSING SYSTEM

(71) Applicants: FUJIFILM Corporation, Tokyo (JP); TOPPAN FORMS CO., LTD., Tokyo (JP); THE UNIVERSITY OF TOKYO, Tokyo (JP)

(72) Inventors: Yoshihisa Usami, Kanagawa (JP); Takayoshi Yokoyama, Tokyo (JP); Yuki Owashi, Tokyo (JP); Hiroyuki Matsui, Tokyo (JP); Junichi Takeya, Tokyo (JP)

(73) Assignees: FUJIFILM Corporation, Tokyo (JP); TOPPAN FORMS CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/024,119

(22) Filed: Jun. 29, 2018

(65) Prior Publication Data

US 2018/0307872 A1 Oct. 25, 2018

Related U.S. Application Data

(63) Continuation of application No. PCT/JP2017/001491, filed on Jan. 18, 2017.

(30) Foreign Application Priority Data

Jan. 29, 2016 (JP) ................. 2016-015712

(51) Int. Cl.
*G06K 7/10* (2006.01)
*G06K 19/07* (2006.01)

(52) U.S. Cl.
CPC ..... *G06K 7/10158* (2013.01); *G06K 19/0709* (2013.01)

(58) Field of Classification Search
None
See application file for complete search history.

(56) References Cited

U.S. PATENT DOCUMENTS

2004/0119504 A1* 6/2004 Baude ................ G06K 19/0701
326/104

FOREIGN PATENT DOCUMENTS

| JP | 2004-297779 A | 10/2004 |
| JP | 2008-077554 A | 4/2008 |
| WO | 2004/051880 A1 | 6/2004 |

OTHER PUBLICATIONS

International Search Report issued in PCT/JP2017/001491; dated Apr. 18, 2017.
Written Opinion issued in PCT/JP2017/001491; dated Apr. 18, 2017.

* cited by examiner

*Primary Examiner* — Kristy A Haupt
(74) *Attorney, Agent, or Firm* — Studebaker & Brackett PC (57) ABSTRACT

A sensing system includes an electronic tag and a reading device that transmits and receives information to and from the electronic tag. The reading device includes a transmission unit that sends an alternating-current radio wave including a high-frequency component and a low-frequency component. The electronic tag does not include a power supply and includes a receiving unit that obtains a power supply voltage from the high-frequency component of the alternating-current radio wave and obtains a clock signal from the low-frequency component and a return unit that maintains a maximum amplitude of the clock signal and sends a combination of information and the clock signal as a return signal. The reading device further includes a processing unit that decodes the return signal sent from the electronic tag on the basis of the clock signal.

19 Claims, 7 Drawing Sheets

SENSING SYSTEM

CROSS-REFERENCE TO RELATED APPLICATIONS

This application is a Continuation of PCT International Application No. PCT/JP2017/001491 filed on Jan. 18, 2017, which claims priority under 35 U.S.C. § 119(a) to Japanese Patent Application No. 2016-015712 filed on Jan. 29, 2016. The above application is hereby expressly incorporated by reference, in its entirety, into the present application.

BACKGROUND OF THE INVENTION

1. Field of the Invention

The present invention relates to a sensing system including an electronic tag and a reading device that transmits and receives information to and from the electronic tag, and more particularly, to a sensing system in which a radio tag obtains a power supply voltage and a clock signal on the basis of a signal transmitted from a reading device.

2. Description of the Related Art

In recent years, a technique has been known which provides a radio tag that is called, for example, an integrated circuit tag (IC tag), an electronic tag, or a radio frequency identification (RFID) tag in an object, reads information recorded on the radio tag with a reading device, and recognizes various kinds of information related to the object. The radio tags are classified into an active type that includes a power supply and a passive type that does not include a power supply. The passive-type radio tag that does not include a power supply obtains power from a carrier wave transmitted from a reading device, superimposes information stored in the radio tag on a signal carrier wave, and sends the signal carrier wave to the reading device.

As a method for creating a clock signal, WO2004/051880A discloses a method which divides the frequency of the carrier wave from the reading device to create a clock signal. In addition, there is a method in which a self-excited local oscillator is provided in a radio tag to create a clock signal. Furthermore, there are the following methods: a method in which a self-excited local oscillator is provided in a radio tag; and a method in which self-excited oscillation is performed by a combination of, for example, a capacitor, a resistor, and a coil.

SUMMARY OF THE INVENTION

In the method which divides the frequency of the carrier wave to create the clock signal, in a case in which the frequency of the carrier wave is high, there is a problem that many frequency dividers are required, which results in an increase in power consumption. In addition, in the method which provides the self-excited local oscillator, in a case in which, for example, a quartz oscillator is used as the self-excited local oscillator, it is possible to create a clock signal with a stable frequency. However, it is difficult to reduce the size of the quartz oscillator.

The method that provides the self-excited local oscillator and the method in which self-excited oscillation is performed by a combination of, for example, a capacitor, a resistor, and a coil have the problem that the power supply voltage generated in the radio tag varies depending on a communication distance between the radio tag and the reading device, the oscillator formed by a combination of, for example, the capacitor, the resistor, and the coil is affected by the variation, and the oscillating frequency of the oscillator is not stable.

An object of the invention is to provide a sensing system that can solve the problems of the related art, simplify the configuration of an electronic tag, and can stably transmit and receive information between the electronic tag and a reading device.

In order to achieve the object, the invention provides a sensing system comprising: an electronic tag; and a reading device that transmits and receives information to and from the electronic tag. The reading device includes a transmission unit that sends an alternating-current radio wave including a high-frequency component and a low-frequency component. The electronic tag does not include a power supply and includes a receiving unit that obtains a power supply voltage from the high-frequency component of the alternating-current radio wave and obtains a clock signal from the low-frequency component and a return unit that maintains a maximum amplitude of the clock signal and sends a combination of information and the clock signal as a return signal. The reading device further includes a processing unit that decodes the return signal sent from the electronic tag on the basis of the clock signal.

Preferably, the electronic tag includes a waveform shaping unit that amplifies the clock signal.

Preferably, the reading device includes a first waveform shaping unit that extracts the clock signal from the return signal sent from the electronic tag and a second waveform shaping unit that extracts the information of the electronic tag from the return signal.

For example, a frequency of the high-frequency component is in a range of 100 kHz to 10 GHz. For example, a frequency of the low-frequency component is in a range of 100 Hz to 1.5 MHz. Preferably, at least one of the electronic tag or the reading device is an organic semiconductor element.

According to the invention, it is possible to provide a sensing system that simplifies the configuration of an electronic tag and can stably transmit and receive information between the electronic tag and a reading device.

DESCRIPTION OF THE PREFERRED EMBODIMENTS

Hereinafter, a sensing system according to the invention will be described in detail on the basis of a preferred embodiment illustrated in the accompanying drawings.

In the following description, "to" indicating a value range includes the upper and lower limits of the range. For example, in a case in which ε is in the range from a value α to a value β, the range of ε includes the value α and the value β, which is mathematically represented by $\alpha \leq \varepsilon \leq \beta$.

Figure 1:
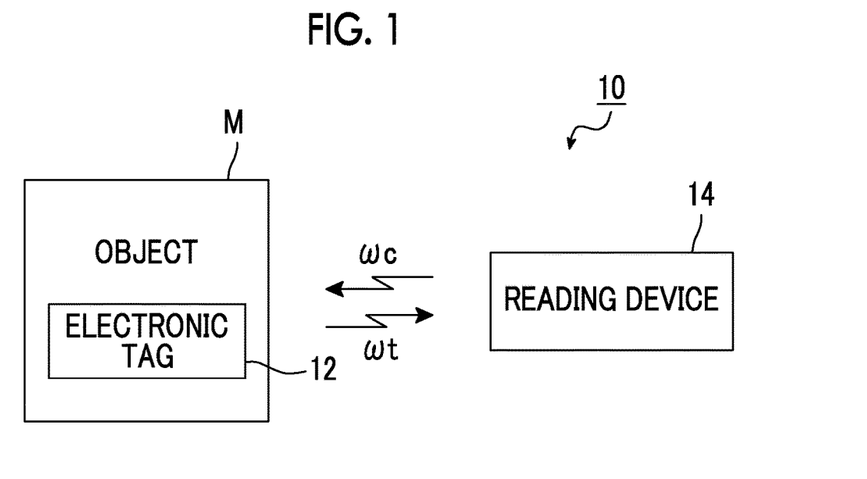
FIG. 1 is a diagram schematically illustrating a sensing system according to an embodiment of the invention.
Figure 2:
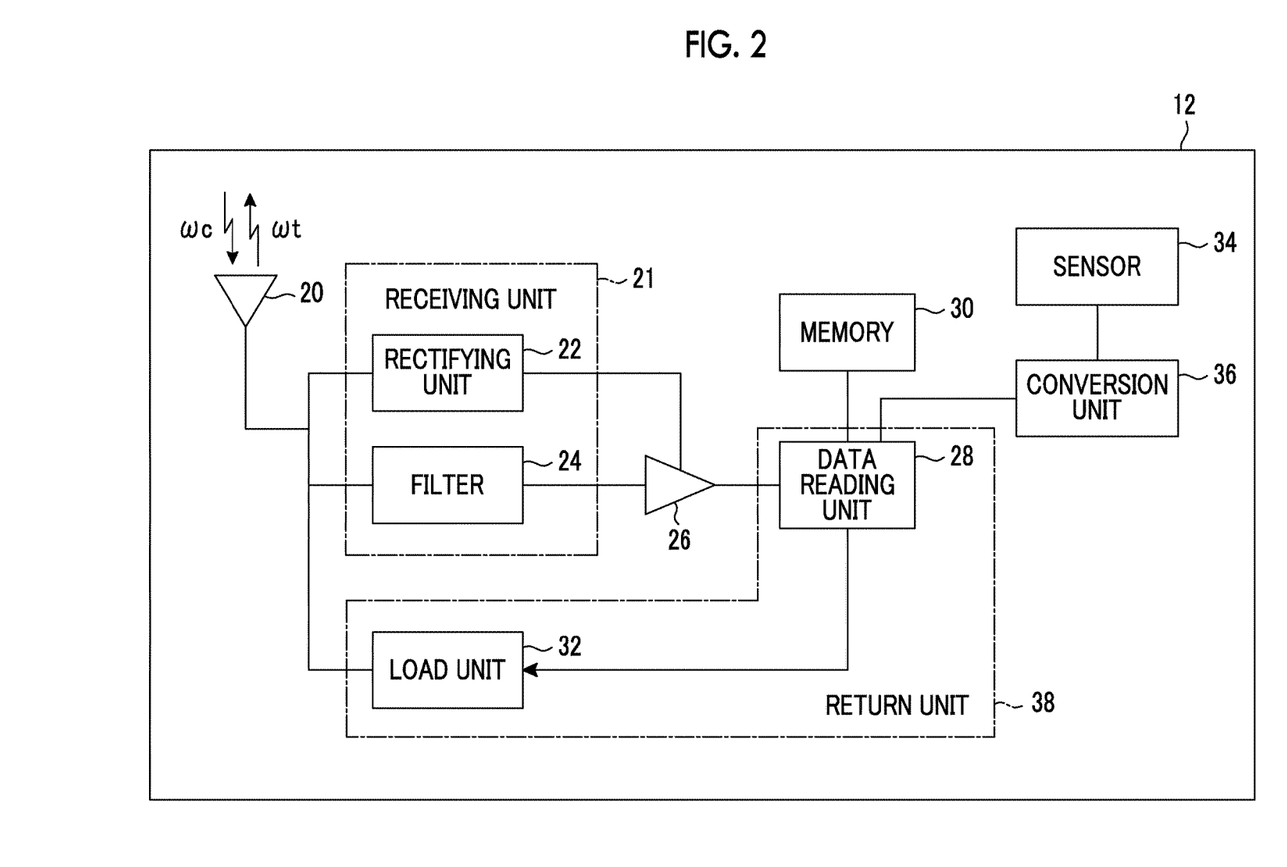
FIG. 2 is a diagram schematically illustrating an electronic tag of the sensing system according to the embodiment of the invention.
Figure 3:
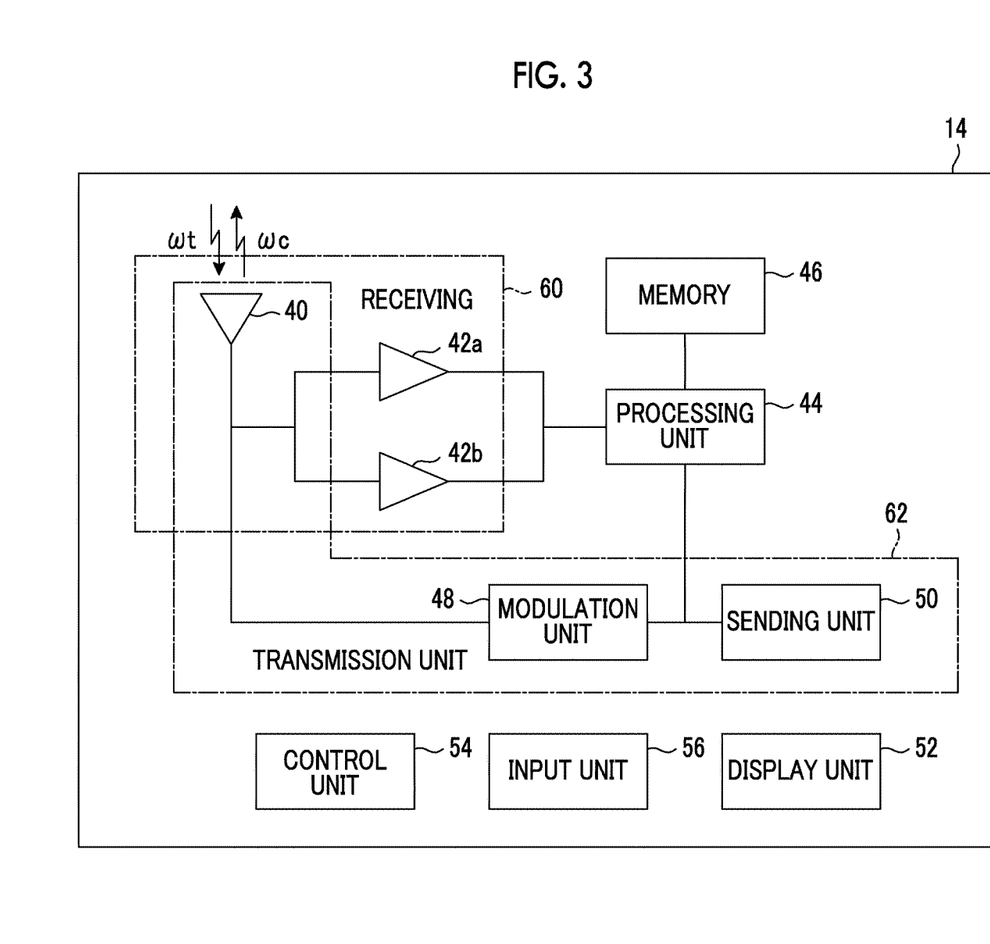
FIG. 3 is a diagram schematically illustrating a reading device of the sensing system according to the embodiment of the invention.

FIG. 1 is a diagram schematically illustrating a sensing system according to an embodiment of the invention. FIG. 2 is a diagram schematically illustrating an electronic tag of the sensing system according to the embodiment of the invention. FIG. 3 is a diagram schematically illustrating a reading device of the sensing system according to the embodiment of the invention.

A sensing system 10 illustrated in FIG. 1 includes an electronic tag 12 that stores identification information and a reading device 14 that reads information from the electronic tag 12 in a non-contact manner. The reading device 14 transmits and receives information to and from the electronic tag 12.

The electronic tag 12 is attached to an object M and is then used. Here, identification information is given to the object M. Examples of the object M include ingredients, such as meat, fish, and vegetables, and containers, such as bags, bottles, and cans. In the sensing system 10, the attachment of the electronic tag 12 to the object M makes it possible to trace the object M during a distribution process.

An example in which the electronic tag 12 includes a sensor 34 as illustrated in FIG. 2 will be described. In this case, it is possible to trace the object M during a distribution process. In addition, it is possible to trace a temperature history of the object M in a case in which the sensor 34 is a temperature sensor.

The electronic tag 12 is not limited to the configuration that includes the sensor 34 and may be a tag that can specify identification information without the sensor 34.

The electronic tag 12 is a passive type without a power supply and does not have a power supply. As illustrated in FIG. 2, the electronic tag 12 includes an antenna 20, a rectifying unit 22, a filter 24, a waveform shaping unit 26, a data reading unit 28, a memory 30, a load unit 32, the sensor 34, and a conversion unit 36. The rectifying unit 22 and the filter 24 form a receiving unit 21. The data reading unit 28 and the load unit 32 form a return unit 38.

The rectifying unit 22, the filter 24, and the load unit 32 are connected in parallel to the antenna 20. The rectifying unit 22 and the filter 24 are connected to the waveform shaping unit 26. The waveform shaping unit 26 is connected to the data reading unit 28. The memory 30 is connected to the data reading unit 28 and the sensor 34 is connected to the data reading unit 28 through the conversion unit 36. In addition, the data reading unit 28 is connected to the load unit 32.

The antenna 20 is used to receive a carrier wave $\omega c$ from the reading device 14 and to transmit a radio wave $\omega t$ to the reading device 14. The configuration of the antenna 20 is not particularly limited as long as the antenna 20 can receive the carrier wave $\omega c$ from the reading device 14 and transmit the radio wave $\omega t$ to the electronic tag 12. Various known antennas can be used. The carrier wave $\omega c$ from the reading device 14 is an alternating-current radio wave including a high-frequency component and a low-frequency component, which will be described in detail below. In the carrier wave, a frequency signal which is a clock signal is superimposed on a general carrier wave used for radio frequency identification (RFID).

The rectifying unit 22 converts the high-frequency component of the carrier wave $\omega c$ which has been received from the reading device 14 through the antenna 20 into a direct-current voltage and obtains the power supply voltage of the electronic tag 12. The rectifying unit 22 includes, for example, two rectifying transistors (not illustrated) and a capacitor (not illustrated). The capacitor is an output capacitor that accumulates charge. In the rectifying unit 22, the two rectifying transistors are connected in series to each other and the capacitor is connected in parallel to the rectifying transistors connected in series to each other. In the two rectifying transistors connected in series to each other, the end of the rectifying transistor is grounded and the end of the rectifying transistor is connected to the waveform shaping unit 26. In this way, the direct-current voltage is supplied to the waveform shaping unit 26 and the waveform shaping unit 26 operates. The configuration of the rectifying unit 22 is not particularly limited as long as the rectifying unit 22 can obtain the power supply voltage of the electronic tag 12 from the high-frequency component of the carrier wave $\omega c$ from the reading device 14.

The filter 24 creates a clock signal of the electronic tag 12. The filter 24 creates the clock signal from the low-frequency component of the carrier wave $\omega c$ from the reading device 14. The configuration of the filter 24 is not particularly limited as long as the filter 24 can create the clock signal. The frequency of the clock signal is, for example, 20 kHz and 26.5 kHz. The frequencies are included as the low-frequency component of the carrier wave $\omega c$. The filter 24 that can obtain the clock signal with the frequencies of 20 kHz and 26.5 kHz is appropriately used.

The waveform shaping unit 26 changes the clock signal obtained by the filter 24 to a high level in a case in which the clock signal is higher than a reference voltage which is a comparison criterion and changes the clock signal to a low level in a case in which the clock signal is lower than the reference voltage. In this way, it is possible to obtain a square-wave clock signal. Specifically, for example, the waveform shaping unit 26 performs a process of changing the voltage to 5 V in a case in which the clock signal obtained by the filter 24 has an amplitude in the range of 2 V to 4 V and is higher than a reference voltage 3 V and changes the voltage to 0 V in a case in which the clock signal is lower than 3 V. In this way, a square-wave clock signal in the range of 0 V to 5 V is obtained. In addition, the voltage which is a comparison criterion is set to the waveform shaping unit 26 in advance. For example, a comparator is used as the waveform shaping unit 26. Since the clock signal is obtained by the filter 24, the waveform shaping unit 26 is not necessarily provided and may not be provided. It is preferable to provide the waveform shaping unit 26 in order to increase the accuracy of the clock signal.

The data reading unit 28 reads the identification information stored in the memory 30 and acquires the information obtained by the sensor 34 from the conversion unit 36. In addition, for example, the data reading unit 28 adds a start of frame (SOF) that is required as a data start signal in the reading device 14 in series to the head of the read identification information stored in the memory 30 and the information obtained by the sensor 34 and adds an end of frame (EOF) that is required as a data end signal in series to the end of the data of the information to obtain return data. The data reading unit 28 combines the return data with the clock signal. The configuration of the data reading unit 28 is not particularly limited as long as it has the above-mentioned functions.

The return data is, for example, a digital signal which is represented by a low-level signal of "0" and a high-level signal of "1".

Figure 4:
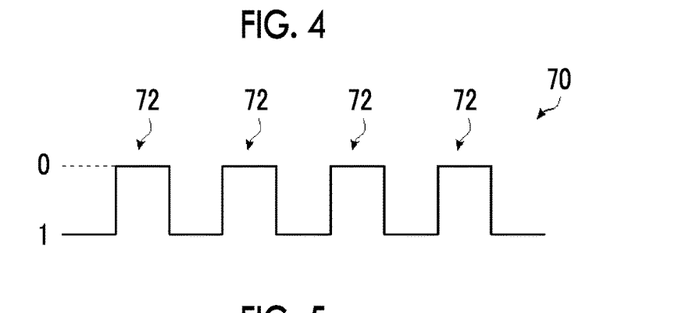
FIG. 4 is a diagram schematically illustrating an inverted signal of a clock signal.
Figure 5:
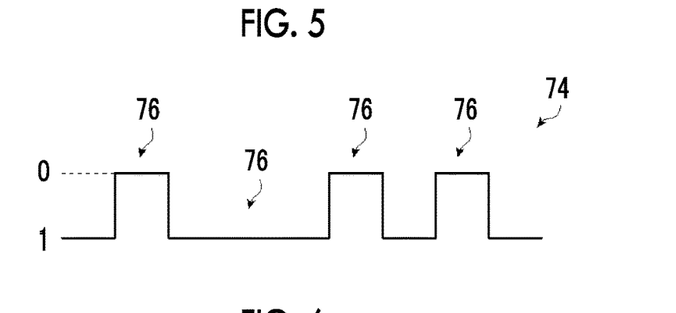
FIG. 5 is a diagram schematically illustrating an example of return data.

The data reading unit 28 matches a high-level portion 72 of an inverted signal 70 of the clock signal illustrated in FIG. 4, that is, a low-level portion of the clock signal with a high-level signal or low-level signal portion 76 of return data 74 illustrated in FIG. 5. That is, the data reading unit 28 matches the time of the high-level signal or the low-level signal of the return data 74 with the low-level portion of the clock signal.

The memory 30 stores identification information indicating the individual information of the electronic tag 12. In addition, the memory 30 stores the information obtained by the sensor 34. The memory 30 is not particularly limited as long as it can store the identification information of the electronic tag 12 and the information obtained by the sensor 34. A rewritable memory is used as the memory 30. The configuration of the memory 30 is not particularly limited and various known memories can be used.

A sensor corresponding to the purpose of the sensing system 10 can be appropriately used as the sensor 34. The sensor 34 is, for example, a temperature sensor. The sensor 34 is not limited to the temperature sensor. For example, a pressure sensor, an optical sensor, an illuminance sensor, a humidity sensor, a gas sensor, an ultrasound sensor, a water sensor, a radiation sensor, a magnetic sensor, an odor sensor, a pH (hydrogen ion concentration index) sensor, a turbidity sensor, an altitude sensor, and an acceleration sensor can be used. The number of sensors 34 is not limited to 1. A plurality of sensors 34 may be used or a plurality of combinations of the above-mentioned various sensors may be used.

The conversion unit 36 converts an analog signal obtained by the sensor 34 into a digital signal. The configuration of the conversion unit 36 is not particularly limited as long as the conversion unit 36 can convert an analog signal into a digital signal. The conversion unit 36 includes, for example, an 8-bit analog/digital conversion circuit. In a case in which the sensor 34 can output a digital signal, the conversion unit 36 may not be provided.

The load unit 32 maintains the maximum amplitude of a portion corresponding to the clock signal in the return data created by the data reading unit 28 and adjusts the amplitude of a portion corresponding to the information, that is, a portion corresponding to the return data. As described above, the data reading unit 28 matches the high-level signal or low-level signal portion 76 of the return data 74 with the position of the low-level signal of the clock signal. Here, the low-level signal of the clock signal corresponds to a region 79 with a small amplitude in a carrier wave 78 illustrated in FIG. 6.

Figure 6:
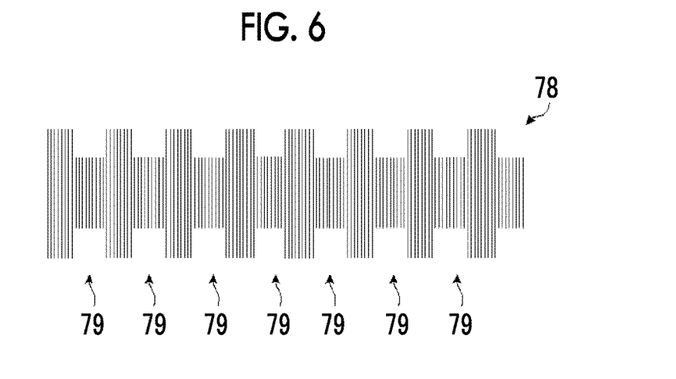
FIG. 6 is a diagram schematically illustrating an example of a carrier wave.

The load unit 32 performs amplitude control for the region 79 with a small amplitude in the carrier wave 78 illustrated in FIG. 6, on the basis of the matching of the time of the high-level signal or the low-level signal of the return data 74 with the low-level portion of the clock signal by the data reading unit 28. Specifically, for example, in the case of the high-level signal of the return data, the loading unit 32 reduces the amplitude of the region 79. In the case of the low-level signal, the load unit 32 maintains the amplitude of the region 79 without any change. Therefore, as described above, the return data is combined while the maximum amplitude is maintained to obtain a return signal. The load unit 32 transmits the return signal as the radio wave ωt from the antenna 20 to the reading device 14.

The configuration of the load unit 32 is not particularly limited as long as the load unit can adjust the amplitude as described above. Since the load unit 32 maintains the maximum amplitude, the amplitude of the carrier wave ωc input to the rectifying unit 22 connected in parallel, particularly, the amplitude of the high-frequency component is prevented from being reduced. Therefore, the rectifying unit 22 can stably obtain the power supply voltage and the electronic tag 12 operates stably.

Next, the reading device 14 will be described.

The reading device 14 includes an antenna 40, a first waveform shaping unit 42a, a second waveform shaping unit 42b, a processing unit 44, a memory 46, a modulation unit 48, a sending unit 50, a display unit 52, a control unit 54, and an input unit 56. The antenna 40, the first waveform shaping unit 42a, and the second waveform shaping unit 42b form a receiving unit 60. The antenna 40, the modulation unit 48, and the sending unit 50 form a transmission unit 62.

The first waveform shaping unit 42a, the second waveform shaping unit 42b, and the modulation unit 48 are connected in parallel to the antenna 40. The first waveform shaping unit 42a and the second waveform shaping unit 42b are connected in parallel to the processing unit 44. The memory 46 is connected to the processing unit 44. The processing unit 44 is connected to the modulation unit 48. The modulation unit 48 is connected to the sending unit 50.

The antenna 40 is used for transmission and reception to and from the electronic tag 12. The configuration of the antenna 40 is not particularly limited as long as it has the above-mentioned function. Various known antennas can be used.

The first waveform shaping unit 42a extracts the clock signal from the return signal sent from the electronic tag 12. The first waveform shaping unit 42a is, for example, a comparator. The clock signal is transmitted while the maximum amplitude is maintained and the maximum amplitude of the return signal is known in advance. Therefore, a comparative reference voltage is set on the basis of the maximum amplitude.

The second waveform shaping unit 42b extracts the information of the electronic tag 12 from the return signal sent from the electronic tag 12. The information of the electronic tag 12 is obtained as a digital signal. The second waveform shaping unit 42b is, for example, a comparator. The information of the electronic tag 12 is recorded on a portion that has a lower voltage than the clock signal in the return signal. Therefore, the reference voltage is set to a voltage lower than the clock signal.

The processing unit 44 decodes the return signal sent from the electronic tag 12 on the basis of the clock signal. The processing unit 44 decodes the information of the electronic tag 12 obtained by the second waveform shaping unit 42b on the basis of the clock signal obtained by the first waveform shaping unit 42a. A decoding method is not particularly limited and various known decoding methods can be used.

The processing unit 44 collates the decoded information of the electronic tag 12 with the identification information of the electronic tag 12 stored in the memory 46 to specify the identification information of the electronic tag 12.

The sensor 34 is provided in the electronic tag 12. The processing unit 44 also specifies the information obtained by the sensor 34. In this case, the processing unit 44 specifies the information obtained by the sensor 34, using a table or an expression for converting the information of the sensor 34 stored in the memory 46 into a value. For example, in a case in which the sensor 34 is a temperature sensor, it is possible to obtain temperature information. In this case, the identification information and the temperature information are transmitted from the electronic tag 12 to the reading device 14.

In a case in which the carrier wave $\omega c$ is transmitted to the electronic tag 12, the processing unit 44 sets the frequencies of the high-frequency component and the low-frequency component of the carrier wave $\omega c$. The frequency of the high-frequency component is, for example, in the range of 100 kHz to 10 GHz.

For example, the frequency of the high-frequency component is the frequency of a general carrier wave used for radio frequency identification (RFID) and is preferably equal to or greater than 13 MHz, more preferably equal to or greater than 13.56 MHz, and is most preferably 400 MHz, 900 MHz, and 2 GHz.

The frequency of the low-frequency component is, for example, in the range of 100 Hz to 1.5 MHz, is preferably equal to or greater than 1 kHz, and more preferably equal to or greater than 10 kHz.

As described above, the memory 46 stores the identification information of the electronic tag 12. In addition, the memory 46 stores a table or an expression for converting the information obtained by the sensor 34 into a value. The configuration of the memory 46 is not particularly limited as long as the memory 46 can store identification information of the electronic tag 12 and a table or an expression for converting the information obtained by the sensor 34 into a value and various known memories can be used.

In a case in which, for example, a command signal is transmitted as transmission data to the electronic tag 12, the modulation unit 48 converts the transmission data into a format that can be received by the electronic tag 12. A modulation method is not particularly limited and various known modulation methods can be used.

The sending unit 50 oscillates the carrier wave $\omega c$ to be transmitted to the electronic tag 12 and includes an oscillation circuit (not illustrated). As described above, the carrier wave $\omega c$ includes a high-frequency component and a low-frequency component. For example, 26.5 kHz is superimposed on 13.56 MHz in the carrier wave $\omega c$.

The oscillation circuit of the sending unit 50 can oscillate, for example, a combined wave of a high-frequency component and a low-frequency component. In the sending unit 50, an oscillation circuit that oscillates a high-frequency component and an oscillation circuit that oscillates a low-frequency component may be separately provided and the high-frequency component and the low-frequency component may be superimposed to form the carrier wave $\omega c$. The configuration of the sending unit 50 is not particularly limited as long as the sending unit 50 can supply the carrier wave $\omega c$ to the electronic tag 12.

The display unit 52 displays, for example, the result obtained by the reading device 14. For example, the display unit 52 displays a temperature measurement value obtained by the electronic tag 12 as an image or characters. In a case in which there are a plurality of objects M, the display unit 52 displays the temperature measurement values obtained by the electronic tags 12 for each object M. Various types of display devices, such as liquid crystal display panels, can be used as the display unit 52.

The control unit 54 controls each component of the reading device 14.

The input unit 56 is used to input commands in order to set various setting conditions in the reading device 14. The configuration of the input unit 56 is not particularly limited as long as the input unit 56 has the above-mentioned function. For example, a keyboard or a mouse is used as the input unit 56. The input unit 56 may be a touch panel. The reading device 14 may not include the display unit 52 and the input unit 56.

The reading device 14 may transmit the obtained measurement result of the temperature to other devices, for example, a portable information terminal or an information terminal such as a personal computer. Examples of the portable information terminal include a smart phone and a tablet computer.

Next, the operation of the sensing system 10 will be described.

Figure 7:
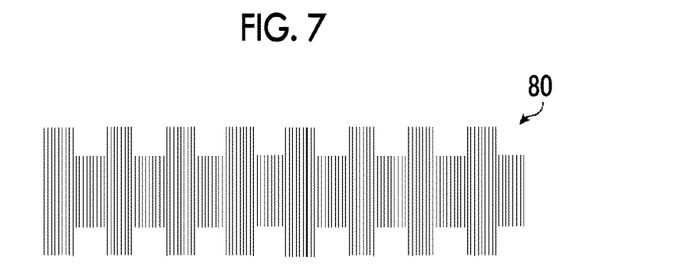
FIG. 7 is a diagram schematically illustrating a carrier wave including a high-frequency component and a low-frequency component.
Figure 8:
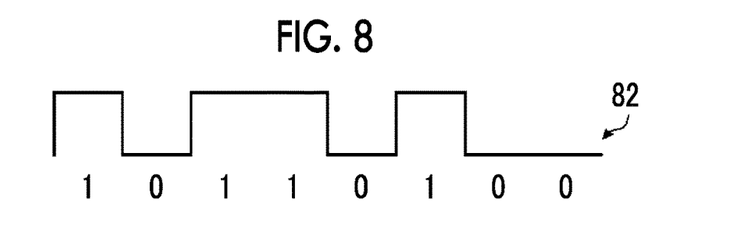
FIG. 8 is a diagram schematically illustrating an example of return data.
Figure 9:
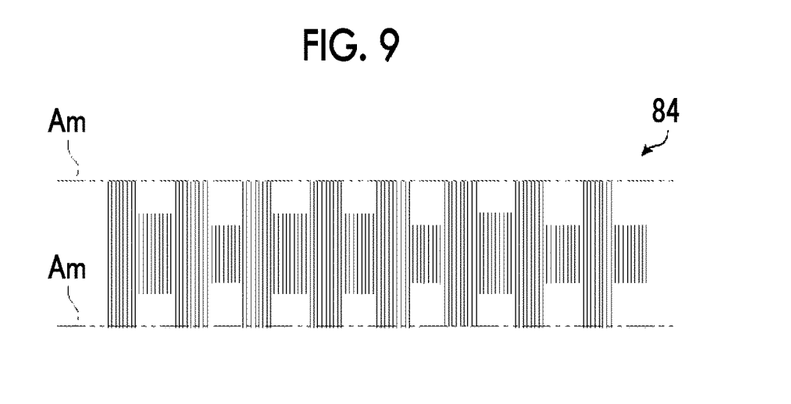
FIG. 9 is a diagram schematically illustrating an example of a return signal.
Figure 10:
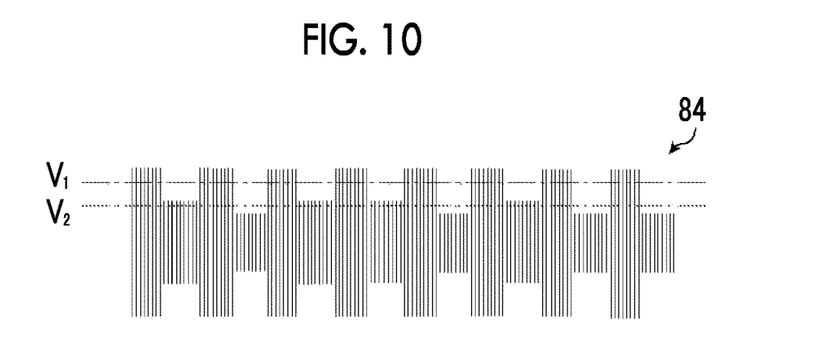
FIG. 10 is a diagram schematically illustrating a reference voltage.
Figure 11:
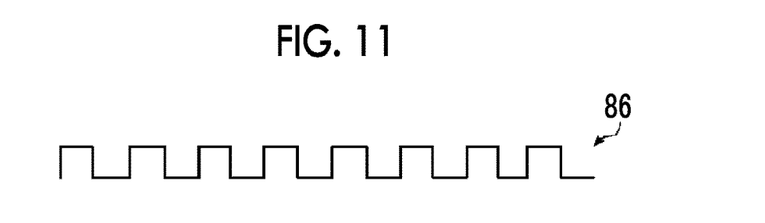
FIG. 11 is a diagram schematically illustrating an example of a clock signal obtained from the return signal.
Figure 12:
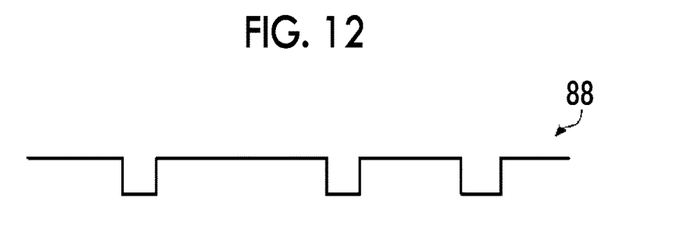
FIG. 12 is a diagram schematically illustrating an example of return data obtained from the return signal.

FIG. 7 is a diagram schematically illustrating a carrier wave including a high-frequency component and a low-frequency component. FIG. 8 is a diagram schematically illustrating an example of return data. FIG. 9 is a diagram schematically illustrating an example of a return signal. FIG. 10 is a diagram schematically illustrating a reference voltage. FIG. 11 is a diagram schematically illustrating an example of a clock signal obtained from the return signal. FIG. 12 is a diagram schematically illustrating an example of return data obtained from the return signal.

As illustrated in FIG. 1, the electronic tag 12 is attached to the object M. In this state, the reading device 14 transmits a carrier wave 80 including a high-frequency component and a low-frequency component illustrated in FIG. 7. In the electronic tag 12, the rectifying unit 22 of the receiving unit 21 obtains a power supply voltage and the filter 24 and the waveform shaping unit 26 obtain a square-wave clock signal. Then, the data reading unit 28 reads return data 82 illustrated in FIG. 8 from the memory 30 and matches the time of a high-level signal or a low-level signal of the return data 82 with a low-level portion of the clock signal as described above. The load unit 32 adjusts the amplitude of the carrier wave 80 on the basis of the matching to obtain a return signal 84 illustrated in FIG. 9. The return signal 84 is maintained at a maximum amplitude Am for comparison with the carrier wave 80 illustrated in FIG. 7. Then, the return signal 84 is transmitted to the reading device 14.

Since the maximum amplitude Am (see FIG. 9) of the return signal 84 is maintained, the amplitude of the carrier wave 80 input to the rectifying unit 22, particularly, the amplitude of a high-frequency component for obtaining the power supply voltage is prevented from being reduced as described above. Therefore, a stable power supply voltage is obtained and the electronic tag 12 operates stably.

Then, in the reading device 14, the first waveform shaping unit 42a obtains a clock signal 86 illustrated in FIG. 11 from the return signal 84 at a first reference voltage $V_1$ (see FIG. 10). The second waveform shaping unit 42b obtains return data 88 illustrated in FIG. 12 from the return signal 84 at a second reference voltage $V_2$ (see FIG. 10). The second reference voltage $V_2$ is lower than the first reference voltage $V_1$.

Since the reading device 14 can obtain the clock signal 86, the reading device 14 can accurately read the return data 88 from the return signal.

The processing unit 44 decodes the return data 88 on the basis of the clock signal 86. The processing unit 44 collates the identification information of the electronic tag 12 and specifies the identification information of the electronic tag 12. In addition, the information obtained by the sensor 34 of the electronic tag 12, for example, temperature information is specified. The temperature information is stored in the memory 46. For example, the identification information and the temperature information are displayed on the display unit 52.

Figure 13:
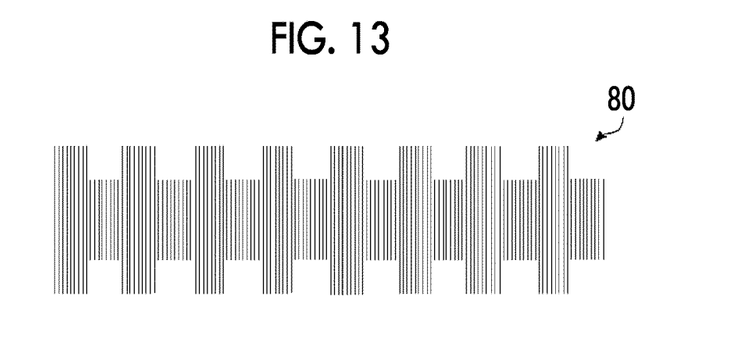
FIG. 13 is a diagram schematically illustrating a carrier wave including a high-frequency component and a low-frequency component.
Figure 14:
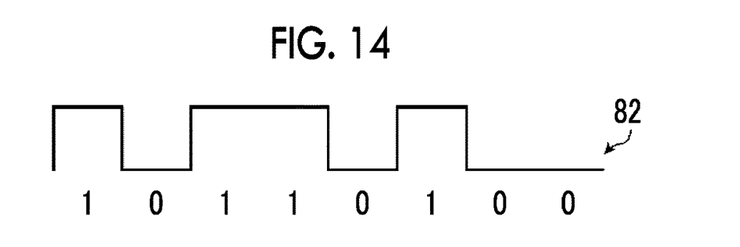
FIG. 14 is a diagram schematically illustrating an example of return data.
Figure 15:
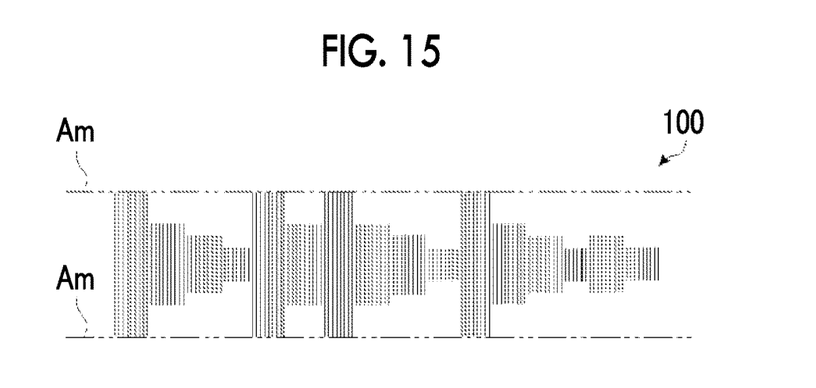
FIG. 15 is a diagram schematically illustrating an example of a return signal for comparison.
Figure 16:
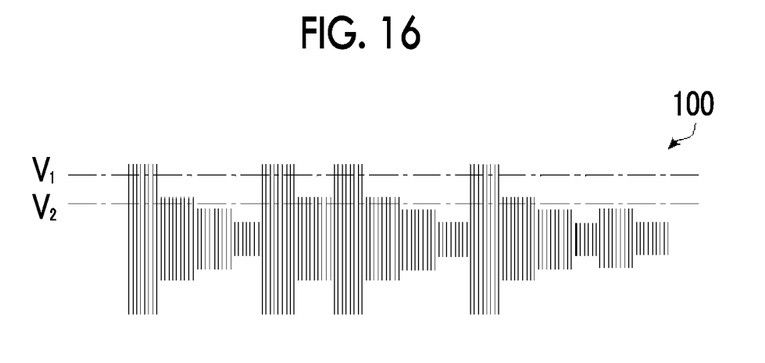
FIG. 16 is a diagram schematically illustrating a reference voltage.
Figure 17:
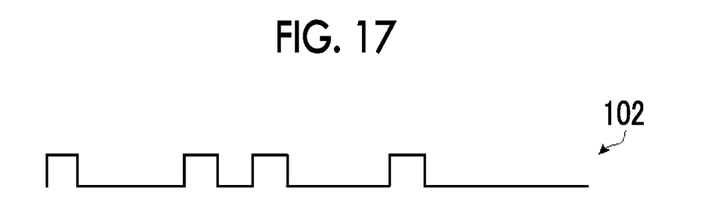
FIG. 17 is a diagram schematically illustrating an example of a clock signal obtained from the return signal.
Figure 18:
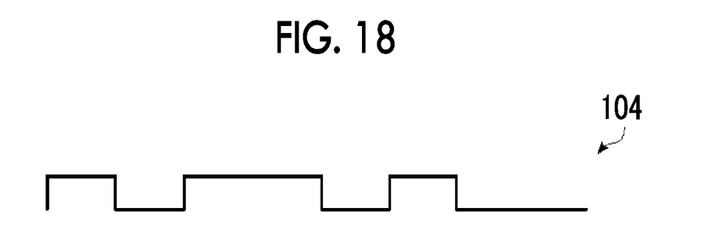
FIG. 18 is a diagram schematically illustrating an example of return data obtained from the return signal.

Here, FIG. 13 is a diagram schematically illustrating a carrier wave including a high-frequency component and a low-frequency component. FIG. 14 is a diagram schematically illustrating an example of return data. FIG. 15 is a diagram schematically illustrating an example of a return signal for comparison. FIG. 16 is a diagram schematically illustrating a reference voltage. FIG. 17 is a diagram schematically illustrating an example of a clock signal obtained from the return signal. FIG. 18 is a diagram schematically illustrating an example of return data obtained from the return signal. Since FIGS. 13 and 14 are the same as FIGS. 7 and 8, the detailed description thereof will not be repeated.

In a case in which data that is returned in response to the carrier wave 80 is not combined with the clock signal, a return signal 100 illustrated in FIG. 15 is obtained. The maximum amplitude Am of the return signal 100 is not maintained. The first reference voltage $V_1$ and the second reference voltage $V_2$ are set to the return signal 100 as illustrated in FIG. 10 and the first waveform shaping unit 42a obtains a clock signal 102 illustrated in FIG. 17. The second waveform shaping unit 42b obtains return data 104 illustrated in FIG. 18. The clock signal 102 illustrated in FIG. 17 has a loss and a clock signal is not formed. Therefore, it is difficult to read the return data from the return signal. As a result, it is difficult to obtain the identification information of the electronic tag 12 and the temperature information.

Since the maximum amplitude Am (see FIG. 15) of the return signal 100 is not maintained, the amplitude of the carrier wave 80 input to the rectifying unit 22 is reduced as described above. As a result, a stable power supply voltage is not obtained and the electronic tag 12 does not operate stably.

As such, even in a case in which the electronic tag 12 does not include a clock generation unit, it is possible to stably operate the electronic tag 12 by using the carrier wave ωc including a high-frequency component and a low-frequency component from the reading device 14 as described above and thus to transmit and receive information between the electronic tag 12 and the reading device 14. In addition, since it is not necessary to provide a clock generation unit in the electronic tag 12, it is possible to simplify a configuration, to reduce a size, and to reduce costs.

For example, in a case in which the electronic tag 12 is an organic semiconductor element, the operation of the electronic tag 12 is delayed as compared to a semiconductor element using silicon. However, in this case, it is possible to stably operate the electronic tag 12 by using the carrier wave ωc including a high-frequency component and a low-frequency component from the reading device 14 as described above. In addition, it is possible to simplify a configuration, to reduce a size, and to reduce costs.

The electronic tag 12 and the reading device 14 include, for example, a plurality of transistors. However, the transistor is not particularly limited and is, for example, a transistor that is formed on a silicon substrate. It is preferable that the electronic tag 12 is a thin film transistor (TFT) (hereinafter, simply referred to as a coating-type TFT) in which a coating-type semiconductor is included in a semiconductor active layer. The coating-type TFT has the advantages that it is manufactured at a low temperature and it can be formed by printing. Therefore, it is possible to manufacture the coating-type TFT at a low cost using a resin substrate. In addition, in a case in which coating is used, it is possible to manufacture sensors at the same time. Therefore, it is possible to reduce the manufacturing cost of the electronic tag 12 and the reading device 14.

The coating-type TFT is provided with the semiconductor active layer including the coating-type semiconductor. However, the coating-type TFT may include layers other than the semiconductor active layer.

The coating-type TFT is preferably an organic field effect transistor (hereinafter, simply referred to as an FET) and more preferably an insulated-gate FET in which a gate and a channel are insulated from each other.

The structure of the coating-type TFT is not particularly limited and may be various known structures.

Examples of the structure of the coating-type TFT include a structure in which an electrode, an insulating layer, a semiconductor active layer (organic semiconductor layer), and two electrodes are sequentially provided on an upper surface of a substrate in the lowest layer and a bottom-gate top-contact structure. In this structure, the electrode on the upper surface of the substrate in the lowest layer is provided in a portion of the substrate and the insulating layer is provided so as to come into contact with a portion of the substrate other than the electrode. In addition, the two electrodes provided on the upper surface of the semiconductor active layer are provided so as to be separated from each other. Furthermore, the structure may be a top-gate top-contact structure.

It is preferable that at least one of the electronic tag 12 or the reading device 14 is an organic semiconductor element. Therefore, for example, in a transistor forming at least one of the electronic tag 12 or the reading device 14, a semiconductor layer is made of, for example, an organic semiconductor.

In a case in which the semiconductor layer is made of an organic semiconductor, it is easy to manufacture the semiconductor layer, bendability is high, and coating can be performed.

Examples of the organic semiconductor forming the semiconductor layer include a pentacene derivative, such as 6,13-bis(triisopropylsilylethynyl) pentacene (TIPS pentacene), an anthradithiophene derivative, such as 5,11-bis(triethylsilylethynyl) anthradithiophene (TES-ADT), a benzodithiophene (BDT) derivative, a benzothienobenzothiophene (BTBT) derivative, such as dioctylbenzothienobenzothiophene (C8-BTBT), a dinaphthothienothiophene (DNTT) derivative, a dinaphthobenzodithiophene (DNBDT) derivative, a 6,12-dioxaanthanthrene (perixanthenoxanthene) derivative, a naphthalene tetracarboxylic acid diimide (NTCDI) derivative, a perylene tetracarboxylic acid diimide (PTCDI) derivative, a polythiophene derivative, a poly(2,5-bis(thiophen-2-yl)thieno [3,2-b]thiophene) (PBTTT) derivative, a tetracyanoquinodimethane (TCNQ) derivative, oligothiophenes, phthalocyanines, fullerenes, a polyacetylene-based conductive polymer, polyphenylene-based conductive polymers, such as polyparaphenylene and a polyparaphenylene derivative, polyphenylene vinylene, and a polyphenylene vinylene derivative, heterocyclic conductive polymers, such as polypyrrole, a polypyrrole derivative, polythiophene, a polythiophene derivative, polyfuran, and a polyfuran derivative, and ionic conductive polymers, such as polyaniline and a polyaniline derivative.

Among the above-mentioned organic semiconductors, in general, fullerenes, a naphthalene tetracarboxylic acid diimide (NTCDI) derivative, a perylene tetracarboxylic acid diimide (PTCDI) derivative, and a tetracyanoquinodimethane (TCNQ) derivative are used for an N-type organic semiconductor layer and the others are used for a P-type organic semiconductor layer. However, the above-mentioned organic semiconductor becomes a P type or an N type depending on the derivative.

In a case in which the semiconductor layer is made of an organic semiconductor, a method for forming the semiconductor layer is not particularly limited. For example, known methods, such as a coating method, a transfer method, and a vapor deposition method, can be appropriately used.

The thickness of the semiconductor layer is preferably in the range of 1 nm to 1000 nm and more preferably in the range of 10 nm to 300 nm, considering, for example, film formability.

A transistor in which a semiconductor layer is made of an inorganic semiconductor may be used. Oxide semiconductors, such as silicon, zinc oxide (ZnO), and In—Ga—ZnO$_4$, can be used as the inorganic semiconductor forming the semiconductor layer.

In a case in which the semiconductor layer is made of the inorganic semiconductor, a method for forming the semiconductor layer is not particularly limited. For example, a coating method and vacuum film forming methods, such as a vacuum vapor position method and a chemical vapor deposition method, can be used. For example, in a case in which the semiconductor layer is formed by a coating method using silicon, cyclopentasilane can be used.

The invention basically has the above-mentioned configuration. The sensing system according to the invention has been described in detail above. However, the invention is not limited to the above-described embodiment and various modifications or changes of the invention can be made without departing from the scope and spirit of the invention.

EXPLANATION OF REFERENCES

10: sensing system
12: electronic tag
14: reading device
20, 40: antenna
21, 60: receiving unit
22: rectifying unit
24: filter
26: waveform shaping unit
28: data reading unit
30, 46: memory
32: load unit
34: sensor
36: conversion unit
38: return unit
42a: first waveform shaping unit
42b: second waveform shaping unit
44: processing unit
48: modulation unit
50: sending unit
52: display unit
54: control unit
56: input unit
62: transmission unit
70: inverted signal
72: portion
74: return data
76: portion
78: carrier wave
79: region
80: carrier wave
82: data
84: return signal
86: clock signal
88: return data
100: return signal
102: clock signal
104: return data
Am: maximum amplitude
M: object
$V_1$: first reference voltage
$V_2$: second reference voltage
ωc: carrier wave
ωt: radio wave

What is claimed is:

1. A sensing system comprising:
an electronic tag; and
a reading device that transmits and receives information to and from the electronic tag,
wherein the reading device includes a transmission unit that sends an alternating-current radio wave including a high-frequency component and a low-frequency component,
the electronic tag does not include a power supply and includes a receiving unit that obtains a power supply voltage from the high-frequency component of the alternating-current radio wave and obtains a clock signal from the low-frequency component and a return unit that maintains a maximum amplitude of the clock signal and sends a combination of information and the clock signal as a return signal, and
the reading device further includes a processing unit that decodes the return signal sent from the electronic tag on the basis of the clock signal.

2. The sensing system according to claim 1,
wherein the electronic tag includes a waveform shaping unit that amplifies the clock signal.

3. The sensing system according to claim 2,
wherein the reading device includes a first waveform shaping unit that extracts the clock signal from the return signal sent from the electronic tag and a second waveform shaping unit that extracts the information of the electronic tag from the return signal.

4. The sensing system according to claim 3,
wherein a frequency of the high-frequency component is in a range of 100 kHz to 10 GHz.

5. The sensing system according to claim 3,
wherein a frequency of the low-frequency component is in a range of 100 Hz to 1.5 MHz.

6. The sensing system according to claim 3,
wherein at least one of the electronic tag or the reading device is an organic semiconductor element.

7. The sensing system according to claim 2,
wherein a frequency of the high-frequency component is in a range of 100 kHz to 10 GHz.
8. The sensing system according to claim 2,
wherein a frequency of the low-frequency component is in a range of 100 Hz to 1.5 MHz.
9. The sensing system according to claim 2,
wherein at least one of the electronic tag or the reading device is an organic semiconductor element.
10. The sensing system according to claim 1,
wherein the reading device includes a first waveform shaping unit that extracts the clock signal from the return signal sent from the electronic tag and a second waveform shaping unit that extracts the information of the electronic tag from the return signal.
11. The sensing system according to claim 10,
wherein a frequency of the high-frequency component is in a range of 100 kHz to 10 GHz.
12. The sensing system according to claim 10,
wherein a frequency of the low-frequency component is in a range of 100 Hz to 1.5 MHz.
13. The sensing system according to claim 10,
wherein at least one of the electronic tag or the reading device is an organic semiconductor element.
14. The sensing system according to claim 1,
wherein a frequency of the high-frequency component is in a range of 100 kHz to 10 GHz.
15. The sensing system according to claim 14,
wherein a frequency of the low-frequency component is in a range of 100 Hz to 1.5 MHz.
16. The sensing system according to claim 14,
wherein at least one of the electronic tag or the reading device is an organic semiconductor element.
17. The sensing system according to claim 1,
wherein a frequency of the low-frequency component is in a range of 100 Hz to 1.5 MHz.
18. The sensing system according to claim 17,
wherein at least one of the electronic tag or the reading device is an organic semiconductor element.
19. The sensing system according to claim 1,
wherein at least one of the electronic tag or the reading device is an organic semiconductor element.

* * * * *